July 19, 1932.   K. H. TERNSTEDT   1,867,781
MEANS FOR MAKING WELDING RODS
Original Filed Nov. 2, 1928   6 Sheets-Sheet 1
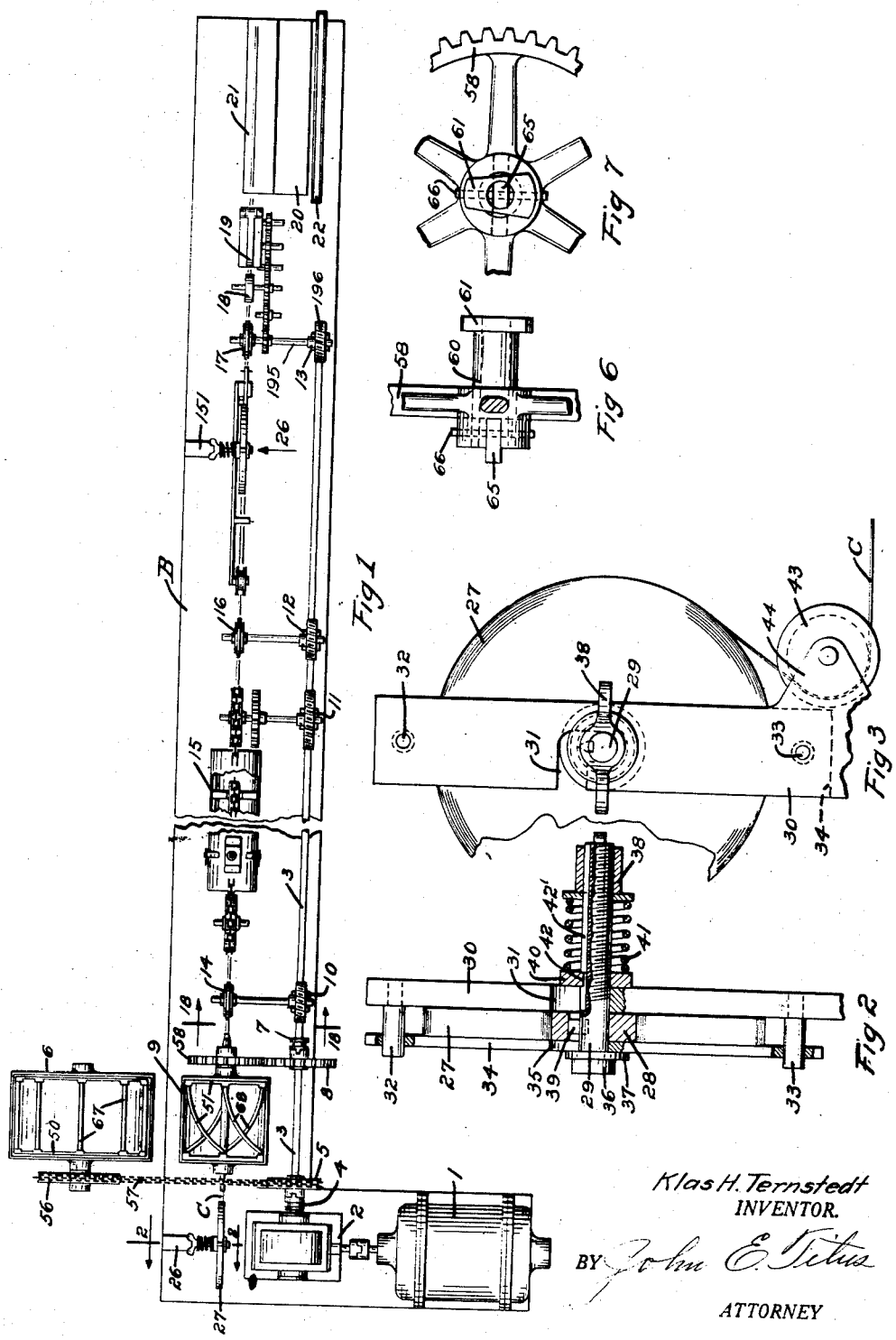
Klas H. Ternstedt
INVENTOR.
BY John E. Titus
ATTORNEY July 19, 1932.  K. H. TERNSTEDT  1,867,781
MEANS FOR MAKING WELDING RODS
Original Filed Nov. 2, 1928   6 Sheets-Sheet 2

Klas H. Ternstedt
INVENTOR.

BY John E. Titus
ATTORNEY.

July 19, 1932.         K. H. TERNSTEDT         1,867,781
MEANS FOR MAKING WELDING RODS
Original Filed Nov. 2, 1928     6 Sheets-Sheet 3
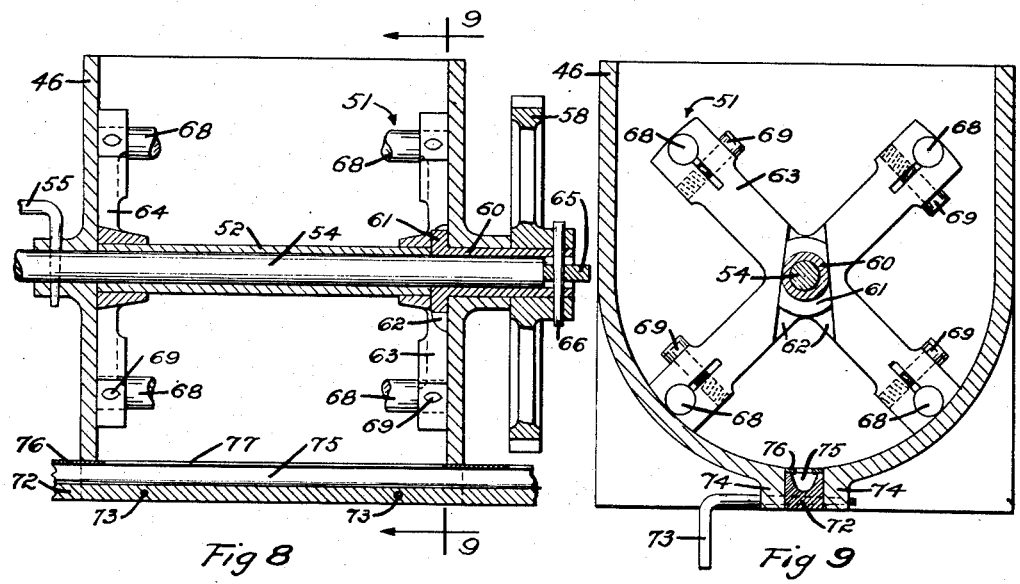
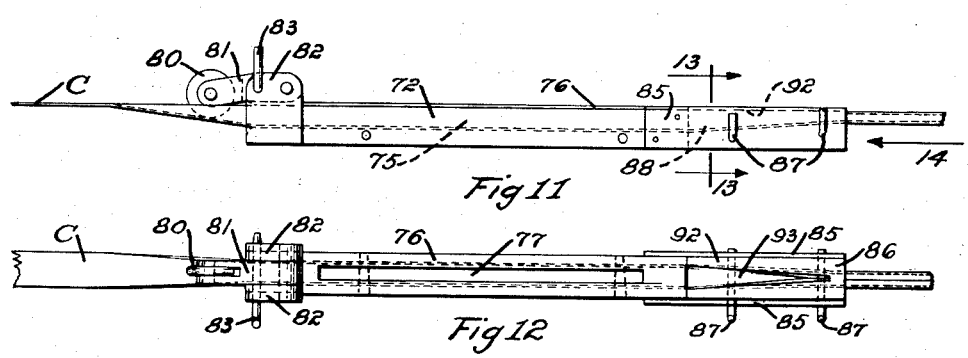
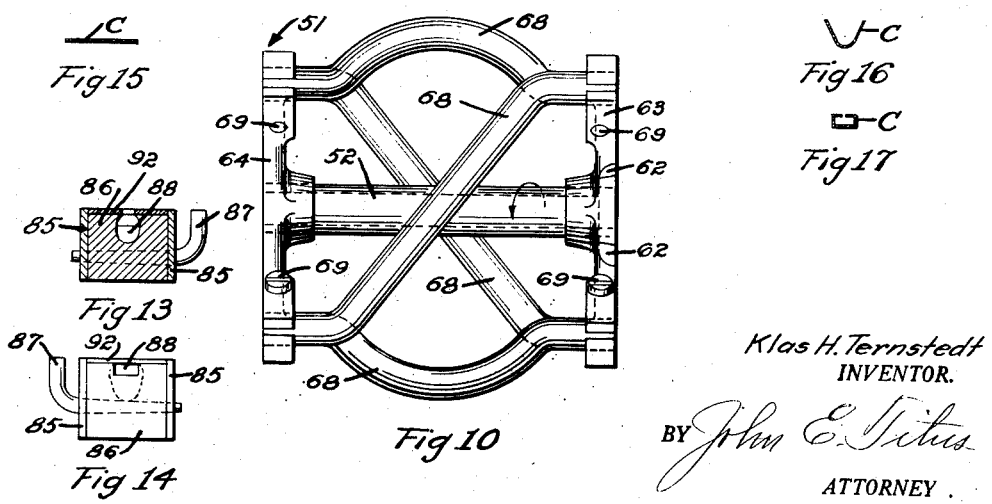
Klas H. Ternstedt
INVENTOR.
BY
ATTORNEY.

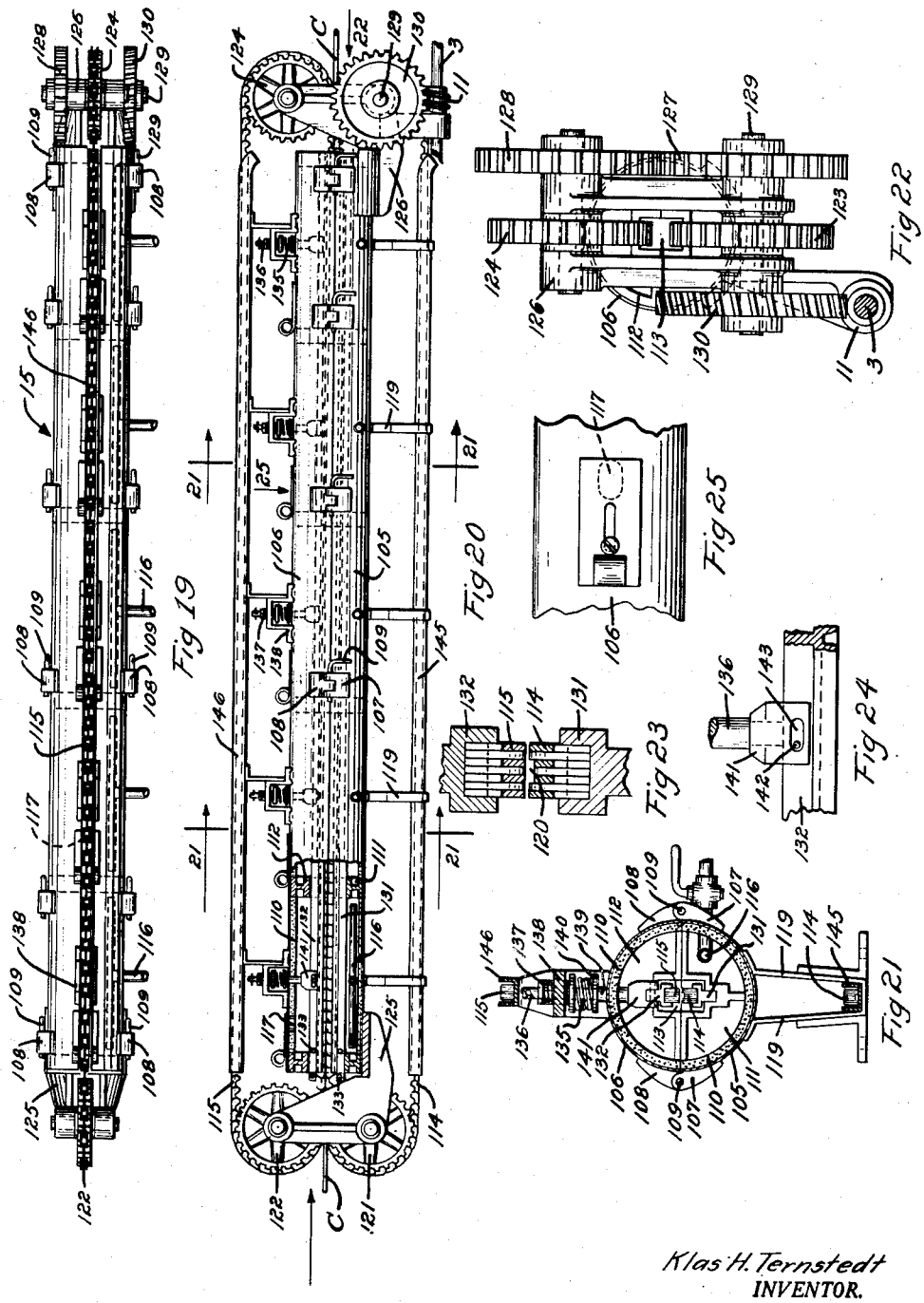

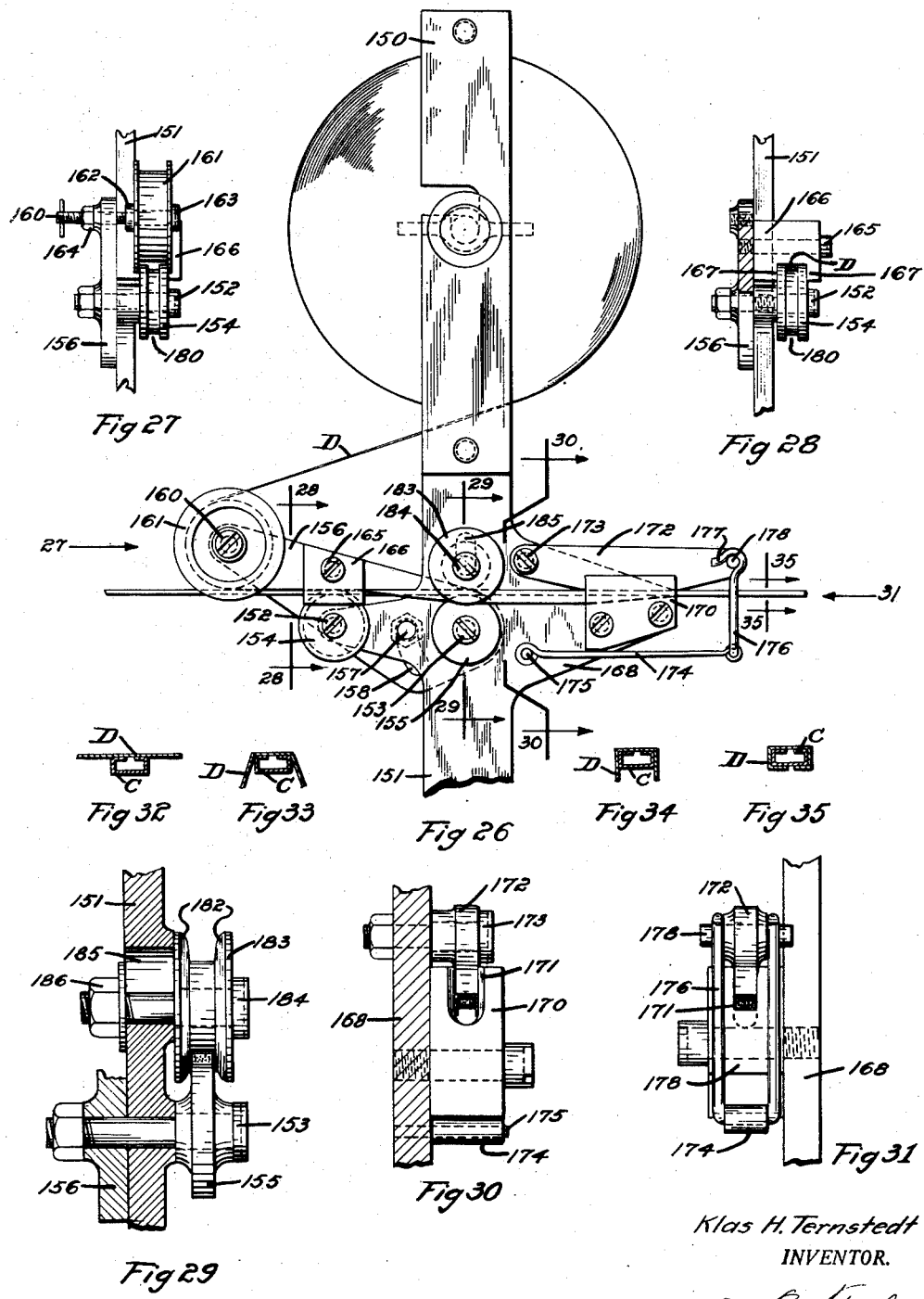

July 19, 1932.  K. H. TERNSTEDT  1,867,781

MEANS FOR MAKING WELDING RODS

Original Filed Nov. 2, 1928  6 Sheets-Sheet 6

Klas H. Ternstedt
INVENTOR.

BY John E. Titus
ATTORNEY.

Patented July 19, 1932

1,867,781

UNITED STATES PATENT OFFICE

KLAS H. TERNSTEDT, OF CHICAGO, ILLINOIS, ASSIGNOR TO OTTMAR M. KREMBS, OF CHICAGO, ILLINOIS

MEANS FOR MAKING WELDING RODS

Application filed November 2, 1928, Serial No. 316,762. Renewed November 30, 1931.

This invention relates to improvements in methods and means for making cored rods more especially for fusing operations such as welding, brazing, hard soldering and the like, which for convenience herein will be termed generally welding rods or cored rods.

In the rods for fusing operations the loose materials which are desired, including the flux, are enclosed in a thin sheathing, and formed into a rod for convenience in handling, as in using the rod for an electrode in arc welding, or in other fusing operations for supplying the added metals and fluxes, the rod being melted down as it is used.

Objects of the invention are to provide methods and means for producing the cored or sheathed rods economically in large quantities at a high rate; to produce rods which are uniform in size and structure and substantially rigid; to produce rods in which the materials in the core are condensed and compacted as the moisture is driven therefrom and the salts fused together with the sheathing contracted and formed tightly around the core as the core is reduced so that the rod becomes substantially as solid and rigid as a metal bar of the same size.

Other objects are to provide a method of sheathing the rods whereby the rods may be rapidly produced, the requisite operations simplified, and the joints in one sheath covered by another sheath so that neither sealed nor lapped points, nor even closed joints, are necessary, also enabling the formation of different sized bars from the same widths of sheathing tape or governing the size of the bar by the size of the tape.

Other objects are to provide means for depositing the loose core material in the tape evenly; to provide means for mixing the materials to a uniform constituency and for controlling the supply of material to the feeding or depositing means so that the tape may be moved along continuously.

To provide means for guiding and tensioning the tape as it runs from the reel so that the tape is accurately guided and tensioned the same amount regardless of the diameter of the supply roll.

To provide stationary folding guides and means for pulling the tape through the guides, so that the tape, which may be quite flimsy or difficult to handle, may be accurately controlled until the strip being formed becomes stiff and can be either shoved or pulled along; and so that the parts required for the folding and forming operations may be simple in form and also quickly detachable for cleaning, insertion or removal of the tape, repairs, adjustments and the like.

To provide a trough-shaped guide for carrying the tape through the feeder, which will accommodate different widths of tapes, and to provide means for bending the tape to enter the channel in the guide so that the tape will spring out against the sides of the channel and form a tight seal to prevent the loose core material working underneath the tape.

To provide means for heating the strip after the sheathing has been formed around the core, and suitably confining and compressing the strip as it is heated to condense and solidify the core and contract the sheathing.

To provide such a construction of the heating means that the forming strip may be passed rapidly and continuously therethrough, and which may be readily opened up to afford access to the tape.

To provide means for gradually heating and compressing the tape as it moves along.

To provide suitable means for adding a sheathing to the strip as it moves along, in which the tape is quickly insertable, accurately and positively guided and closely formed on the strip.

To provide means for severing and sealing the severed ends of the completely formed strip of rod without hindering the continuous movement of the strip.

To provide severing means which are readily adjustable for cutting different lengths.

To provide means for corrugating the sheathing so that the rod can be rolled if so desired.

And to provide methods and means whereby the cored rod may be produced by a series of consecutive and interconnected mechanical operations.

Other objects and advantages will become apparent in the following detailed description, with reference to the accompanying drawings, which is given as an illustration of the manner in which my invention may be carried out, in order that the same may be more clearly understood.

Fig. 1 is a diagrammatic plan view of the machine.

Fig. 2 is a detail section taken on the line 2—2 of Fig. 1.

Fig. 3 is a side elevation of the parts shown in Fig. 2.

Fig. 6 is a detail view of the central portion of the gear shown at the upper left-hand portion of Fig. 4.

Fig. 7 is a side elevation of the parts shown in Fig. 6.

Fig. 8 is a section of the feeder taken on the line 8—8 of Fig. 5, with the stirring element in a slightly changed position.

Fig. 9 is a section taken on the line 9—9 of Fig. 8.

Fig. 10 is an elevation of the stirring element shown in Figs. 4, 5, 8 and 9.

Fig. 11 is an elevation of the tape guide element, shown in the bottom portion of the feeder.

Fig. 12 is a plan view of the parts shown in Fig. 11.

Fig. 13 is a section taken on the line 13—13 of Fig. 11.

Fig. 14 is an end elevation looking in the direction of the arrow 14 in Fig. 11.

Fig. 15 is a cross section of the flat ribbon or tape sheathing as it is supplied to the machine.

Fig. 16 is a cross section of the tape as it appears in passing through the guide shown in Figs. 11 and 12.

Fig. 17 is a cross section of the tape in leaving the guide at the right of Fig. 11.

Fig. 19 is a full plan view of the heating apparatus indicated in the middle portion of Fig. 1.

Fig. 20 is a side elevation of the parts shown in Fig. 19.

Fig. 21 is a section taken on the line 21—21 of Fig. 20.

Fig. 22 is an end elevation looking in the direction of the arrow 22 in Fig. 20.

Fig. 23 is an enlarged cross section of the chains and bars shown in the central portion of Fig. 21.

Fig. 24 is a fragmental side elevation of the upper chain bar which is shown in section in Fig. 23.

Fig. 25 is a plan view of the vent and slide taken at the arrow 25 in Fig. 20.

Fig. 26 is a view of the second tape feeding device, looking in the direction of the arrow in Fig. 1.

Fig. 27 is an end view looking in the direction of the arrow 27 in Fig. 26.

Fig. 28 is a section taken on the line 28—28 of Fig. 26.

Fig. 29 is a section taken on the line 29—29 of Fig. 26.

Fig. 30 is taken on the line 30—30 of Fig. 26.

Fig. 31 is an end elevation looking in the direction of the arrow 31 in Fig. 26.

Fig. 22 is a cross section of the tapes taken on the line 28—28 of Fig. 26.

Fig. 33 shows a cross section of the tapes at the section line 29—29 in Fig. 26.

Fig. 34 is a cross section of the tapes as they enter the die element at the right of Fig. 26.

Fig. 35 is a section of the tapes leaving said die element.

Figures 4, 5:
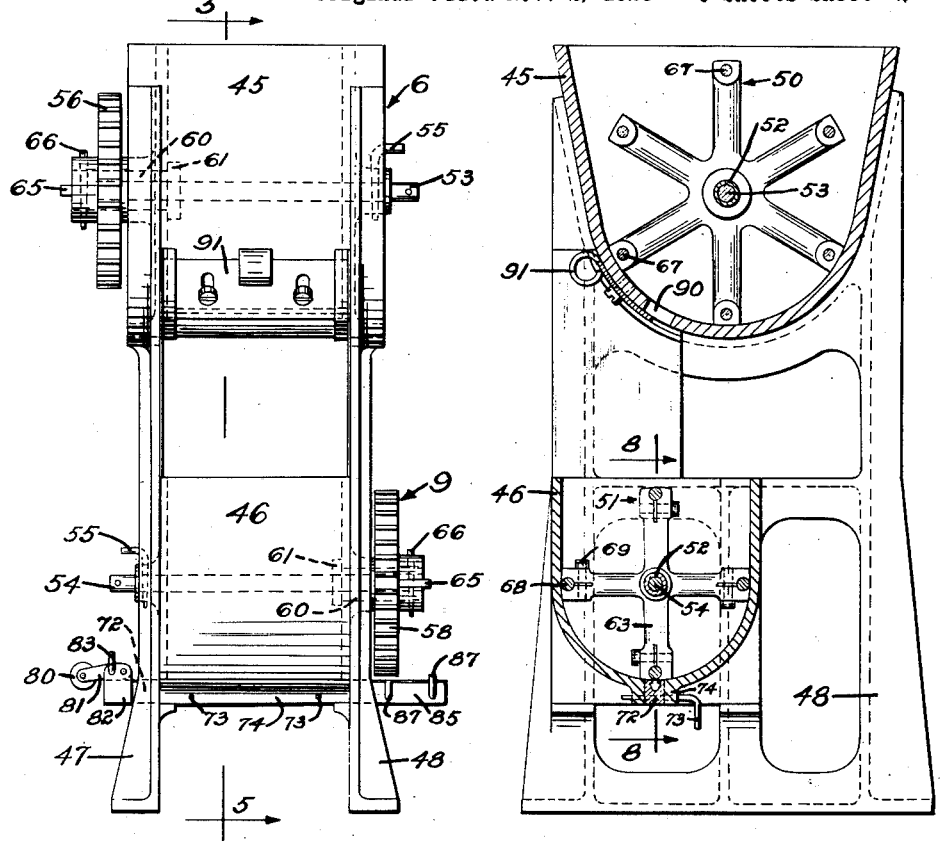
Fig. 4 is an elevation of actual construction of the feeder and mixer indicated at the left in Fig. 1.
Fig. 5 is a section on the line 5—5 of Fig. 4.

By my invention, the various combinations of fluxes and metallic compounds or alloys required, as in the field of welding, brazing or hard soldering, are produced in the form of a bar which is easy of manipulation and proof against deterioration, doing away with the use of solid metal or alloy rods and separate fluxes which have formerly been used.

The welding, brazing or hard soldering agents may be used in a finely comminuted form and are enclosed in a double sheath of tapes or ribbons, which may be either of the same or of dissimilar metals or alloys, such as copper, zinc, aluminum, brass, or even paper, and form useful components in the use of the bar.

The shape of the bar shown in the drawings is rectangular, but other desired cross-sectional forms can be made. According to the methods of my invention, the filler ingredients are deposited on a tape which is curved to retain the filler. The tape is then closed around the filler or core with the seam or joint on the upper side of the strip thus formed. The strip is then given a definite shape under pressure, heated and further compressed until the strip becomes quite solid and rigid. Then a second tape is placed on the strip and subjected to succeeding folding and forming operations as it is carried along with the strip, and forms an outer sheathing which completely covers the joint in the inner sheathing, the seam in the outer sheath being formed at the under side of the strip.

The strip is again compressed to consolidate the outer sheath on the same, and the strip distinguishing marks put on, and the strip cut to predetermined lengths.

The filler may be preheated and cooled before it is fed onto the tape, or fed on without being cooled, or the filler may be fed at the atmospheric temperature, and heated at any time during the formation of the bar.

The machine shown is provided with a unitary base B, on which is mounted the driving motor 1, the speed reduction gear box 2, to which the motor is connected, and suitable bearings in which the drive shaft 3 is rotatably mounted. The drive shaft 3 is connected to the slow-speed shaft of the reduction box 2 and extends along the base for driving the different operating units. Keyed on the shaft 3 is a clutch 4 which engages with the gear 5, which is rotatably mounted on the shaft and which serves to drive the mixer 6; and also the clutch 7 which engages with the gear 8, rotatably mounted on the shaft, which drives the feeder unit 9.

Spaced further along on the shaft are keyed the worms 10, 11, 12 and 13, which serve to drive the rolling unit 14, the heater and compressor 15, the second rolling unit 16, and the finishing rolls 17, the stencil rolls 18, and the cutter 19, respectively, the three units 17, 18 and 19 being all driven from the worm 13, as will be described hereinafter. At the right in Fig. 1, or the discharge end of the machine, may be conveniently provided a scale 20, a transverse conveyor at 21, and the shipping cartons at 22, so that no handling is required from the time the material are supplied to the machine until the finished product is placed in the cartons.

At the feed end of the machine, a bracket 26 is secured to the base B, in which are detachably mounted the rolls 27 of the bottom tape C. The tape is wound on a core 28 which is placed on a mandrel 29.

The upright portion 30 of the bracket 26 is provided with a bayonet slot 31, and the pins 32 and 33, at either side of the slot, on which is slidably mounted a plate 34 which is notched at 35 to conform with the notch 31. At one end the mandrel 29 has a solid head 36 which forms an abutment for the washer 37, and the other end is threaded to receive the tensioning nut 38. In placing the coil 27 on the mandrel, the core is put on next to the washer 37, the core preferably being held from rotating by a pin 39 which is fixed in the stem of the mandrel and engages in a V slot in the core. The collar 40 is then placed on the mandrel and the spring 41 which is inserted between the collar 40 and the nut 38, the collar being held from rotating by means of a lug 42, formed thereon, which engages in a keyway 42' in the mandrel stem.

The roll and mandrel are then mounted on the bracket, in the space between the plate 34 and the bracket, by inserting the stem of the mandrel in the bayonet slots with the collar 40 retracted so that the plate 34 and bracket 30 are included in the grip between the washer 37 and the collar 40 when the collar is released. By this arrangement the tension on the tape can be regulated by adjusting the nut 38, and the tape is positively guided laterally when it is unwound, whether the roll is full or nearly exhausted. Different widths of tapes are readily accommodated, and one edge of the tape is always held firmly against the side of the bracket, which is quite important in the succeeding operations.

In leaving the roll the tape passes under a pulley 43 which is rotatably mounted in lugs 44 formed on the bracket. The tape is pulled along by means of the rolls in the unit 14, and in leaving the pulley 43 the tape C is flat, as shown in Fig. 15, and it next passes through the feeder 9, where it is formed in the trough shape, shown in Fig. 16, by depressing the middle portion or bending up the sides, filled with the core material, and then the edges folded over, as shown in Fig. 17, by the means which will now be described, reference being made more particularly to Figs. 4 to 14, inclusive.

The hopper 45, of the mixer 6, and the hopper 46, of the feeder 9, are fixedly mounted the one above the other between the side frames 47 and 48 which are bolted to the base B, as will be understood. In the mixing hopper 45 is provided a stirring cage 50, and in the feeder hopper 46 is provided a cage 51 which also acts to move the mixture therein along in the direction of the travel of the tape. These cages 50 and 51 are each mounted on sleeves 52 which are rotatably mounted on shafts 53 or 54, which are mounted in the side walls of the respective hoppers. The shafts are held stationary in position by means of the pins 55, so that the shafts may be quickly withdrawn to remove the cages.

The cage 50 is driven by means of a sprocket wheel 56 which is connected to the drive-shaft sprocket by means of the chain belt 57, and the cage 51 is driven by means of the gear wheel 58 which meshes with the drive-shaft gear 8. The cages are detachably connected to their respective drive wheels in similar manners, and the following description of the connection of one will also apply to the connection of the other, similar parts being given the same reference numbers.

In the side wall of the hopper 45, adjacent the driving wheel, is rotatably mounted a sleeve 60 which receives and is rotatable on the end of the stationary shaft. On the inner end the sleeve is provided with a wedge-shaped head 61 which is engaged in a slot 62 which is formed in the outer side of the spider 63 of the cage. The slot 62 is open at one side, as more clearly shown in Fig. 9, so that no side play is needed to insert the cages, and so that the spiders 63 and 64 of the cages can fit closely against the end walls of the hoppers. At the outer ends, the hubs of the drive wheel and the sleeve are slotted transversely to receive the flat key 65, and the key is secured in place by the tapered pin 66. It can now be seen that after the shaft and cage are removed, the sleeve can be readily taken out as for cleaning the hopper which is frequently necessary. The cross bars 67 of the mixer cage 50 may be straight, as shown, but the bars 68 of the feeder cage 51 are curved in a spiral form, and the ends of the spider arms are slotted and drawn together by the bolts 69 to grip the ends of the bars and permit adjustment.

At the bottom, the feeder hopper 46 is slotted longitudinally to receive the guide bar 72, which is held in place by the pins 73 which are inserted through the flanges 74, which are formed on the bottom of the hopper at either side of the slot, and the body of the bar. The bar 72 has a trough 75 with outwardly flaring sides formed therein, Fig. 9, and the trough is covered by a plate 76 which is rigidly secured to the bar. In the portion of the plate 76 which is within the hopper is provided a slot 77 which is slightly narrower than the top of the trough.

As is more clearly shown in Figs. 11 and 12, the tape, from the guide pulley 43, is drawn through the trough 75, the tape being depressed in the middle to enter the trough by the roller 80. The roller 80 is pivotally mounted in the outer end of a bifurcated lever 81 which is pivotally mounted between the bracket plates 82 which are secured to either side of the forward end of the bar 72; and the roller is held in position to bear on the middle of the tape by means of the pin 83 which is inserted through the plates 82 and the lever 81. The pin is withdrawn to allow the roller to be lifted in threading in a new tape. The size of the trough is such that the tape fits freely therein, with the edges of the tape bearing against and covered by the overhanging sides of the slot 77, and the roller is positioned so that it leaves sufficient stiffness in bending the tape to cause the sides of the tape to spring out and press tightly against the sides of the trough to form a seal and prevent any of the mixture from getting under the tape.

At the rear end of the bar 72, are secured, at either side thereof, the plates 85, between which is removably mounted the forming block 86, the block being held in position by the pins 87. The passage 88, through the block 86, conforms at the forward end of the block with the trough 75, and gradually changes in cross section to the rectangle shown in Fig. 14. This forms the tape into the shape shown in Fig. 17 and the edges are bent over to retain the mixture which has been deposited in the tape while passing through the feed hopper.

The ingredients of the mixture are placed in the mixer hopper 45, where the ingredients are thoroughly mixed and forced out through the slot which is provided in the bottom of this hopper. For controlling the flow of the mixture into the hopper 46, a gate 91 is provided which is slidably mounted on the bottom of the hopper 45. By regulating the position of the gate, a substantially constant amount of the mixture can be maintained in the feed hopper 46 to insure the proper filling of the troughed tape.

The tape is pulled through the feeder at a constant rate, and the mixer member 51 is rotated so that the spiral bars 68 wipe over the slot 77 at a slightly faster rate than the tape is moving, causing the mixture to be packed down evenly through the slot and into the tape. The cover 92 of the block 85 is open at 93, through the greater portion of its length, to allow the excess portion of the mixture to flow out as the edges of the tape are being folded over.

Figure 18:
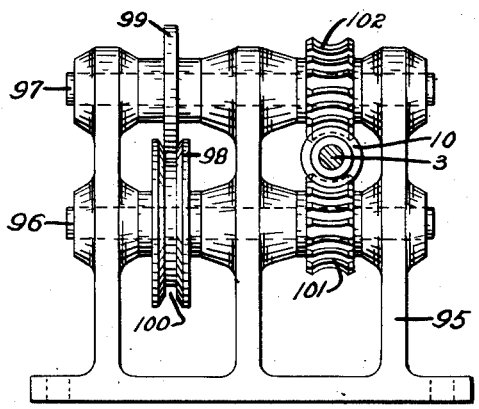
Fig. 18 is an elevation of the forming rolls, taken at the line 18—18 of Fig. 1.
Figure 36:
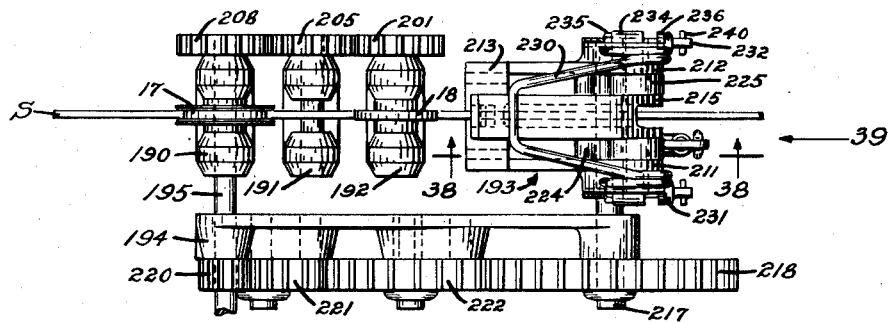
Fig. 36 is a plan view of the finishing rolls and cutter elements indicated at the right in Fig. 1.
Figure 37:
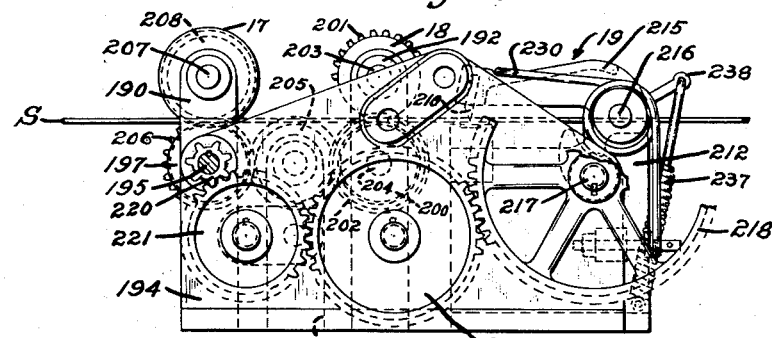
Fig. 37 is a side elevation of the parts shown in Fig. 36.
Figures 38, 39:
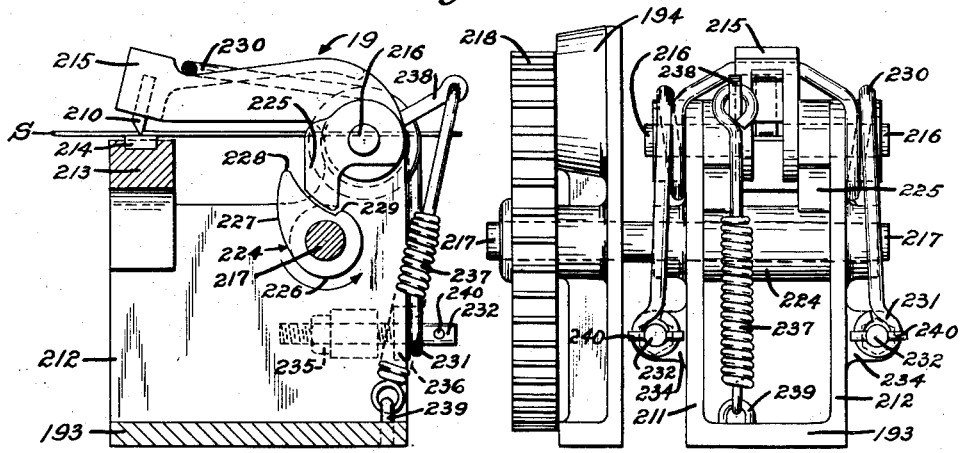
Fig. 38 is a section taken on the line 38—38 of Fig. 36.
Fig. 39 is an end elevation looking in the direction of the arrow 39 in Fig. 26.
Figure 40:
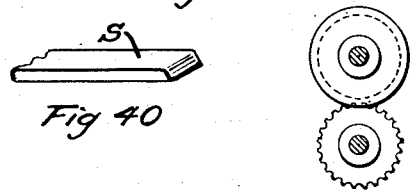
Fig. 40 is a view of the severed end of the finished rod.
Figure 41:
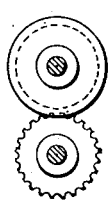
Fig. 41 shows a modified form of the finished rolls.

The tape next passes through the rolling unit 14, the details of which are shown in Fig. 18. In the frame 95, bolted to the base B, are journaled the roll stand shafts 96 and 97, on which, respectively, are keyed the mating rolls 98 and 99, between which the tape is passed. The lower roll 98 has a circumferential groove 100 in which the edge of the plain upper roll 99 enters and forms a pass in which the mixture filled tape is lightly compressed and the corners of the tape given a set so that the shape will be retained. For turning the rolls at the proper speed, the worm 10, on the drive shaft 3 which extends between the shafts 96 and 97, is meshed with the worm gears 101 and 102, which are keyed, respectively, on said shafts.

The partly formed bar as it comes out of the feeder is somewhat flimsy, and it can only be moved through the trough successfully by pulling, as in the manner described, especially if a metallic tape is used, on account of the tendency of the tape to warp and twist. After leaving the rolls 14, the bar becomes more rigid, and the bar can then be either pushed or pulled along as may be desired.

In order to increase the rigidity and compact the bar, it is passed, from the pressure rolls 14, through the heater 15, which is more fully shown in Figs. 19 to 25, inclusive.

The housing of the heater is tunnel-shaped, and consists of the two half shells 105 and 106, which are provided at their edges with the interengaging lugs 107 and 108, respectively, which are pivotally connected by the removable pins 109, so that by removing the pins along one side or the other, the upper half 106 can be swung upwardly to afford access to the interior. The lower shell 105 is supported on the base B by the pairs of legs 119 which are spaced along the length of the lower shell, as best shown in Fig. 20.

The shells are lined with suitable refractory material 110, and the interior of the housing is divided into a series of compartments by means of the partitions formed by the mating pairs of segments 111 and 112 which are secured to the lower and upper shells, respectively. At the center, the partition segments have recesses which register to form the apertures 113 through which the material filled tape is carried between the chain belts 114 and 115. The compartments are separately heated by gas burners 116, to gradually increasing temperatures, and each has a damper-controlled outlet 117 in the top of the upper shell.

The chain belts are of the multiple plate link construction, with the middle plates of the lower chain 114 shortened to provide a groove 120, more clearly shown in Fig. 23, for accommodating the tape. The chains run on the pairs of sprockets 121, 122, and 123, 124, which are journaled in the respective bracket frames 125 and 126 which are mounted on the front and rear ends of the lower shell 105. At the rear or driving end, the sprockets 123 and 124 are connected by the intermeshing gears 127 and 128; and on the shaft 129, on which the sprocket 123 and gear 127 are mounted, is keyed a worm gear 130 which meshes with the worm 11 on the drive shaft 3.

Within the heater chamber, the chains are supported and guided between the channeled bars 131, lower, and 132, upper, which extend throughout the length of the chamber. The lower bar 131 is slidably supported in the lower partition segments 111, and prevented from moving longitudinally by the pins 133 at either side of the first segment 111 only, so that the bar can freely expand or contract as the temperature changes. The pins 133 are also provided in the upper bar where they engage on either side of the first segment 112.

The upper bar 132 extends slidably through the partition segments 112, and rests on the upper chain, added pressure being supplied by the load springs 135, which are distributed along the length of the heater and are adjusted to cause a gradually increasing pressure to bear on the bar. The springs 135 are coiled around vertical plungers 136 which are slidably guided through the upper shell 106 and through the sleeves 137 which are threaded in the top portions of the U-shaped brackets 138, secured on the top of the shell. The plungers 137 have a shoulder 139 which forms an abutment for the flange ring 140, and the springs 135 are compressed between the ring 140 and the lower end of the sleeve 137, the compression being regulated by rotating the sleeve. At the lower ends, the plungers are provided with bifurcated heads 141 which engage the top of the bar 132.

At either side of the bar 132 are projecting pins 142 which enter slots 143 in the sides of the head 141, the slots being larger than the pins to permit free movement of the bar in resting on the chain. The return length of the lower chain is supported in the channel 145, which is mounted between the legs 109; and the return length of the upper chain is supported in the channel 146 which is mounted on the upper shell.

After leaving the heater, the single tape form of the product is passed through the roll stand 16, Fig. 1, which is substantially a duplicate of the roll stand 14, except that the pass is somewhat smaller, the pass being such that the form of the product is reduced in thickness, but not in width.

Next the top tape D is supplied by the parts shown in detail in Figs. 26 to 31, inclusive, which will now be described.

The mounting of the roll of tape D is a duplicate of the mounting of the roll of the bottom tape, which was described above and more particularly shown in Fig. 1 and Fig. 2; the roll being mounted between the tension plate 150, which is a duplicate of the plate 34, and the upper end of the stand bracket 151, which is secured to the base B.

In the bracket 151 are fixedly mounted in spaced relation the studs 152 and 153, on which are rotatably mounted the rollers 154 and 155, over which the strip of the product being formed passes. Pivoted on the stud 153 is an arm 156 which is locked in desired positions by the cap screw 157, the screw being inserted through a slot 158 in the arm 156 and threaded into the bracket 151. Through the outer end of the arm 156 is threaded a shaft 160 on which is mounted the flanged tape guide and positioning roller 161, the roller being rotatable between the collar 162, which is fixed on the shaft, and the enlarged end 163 of the shaft. Lateral positioning adjustment of the roller 161 is accomplished by screwing the shaft in the bracket, and the shaft is locked in place by the lock nut 164. To the medial portion of the arm 156 is fixedly secured, by means of the screw 165, a guide block 166 which is notched at 167 to engage over the roller 154.

Extending rearwardly from the upright portion of the bracket 151 is a projecting portion 168 to which is fixedly secured the die block 170 which has a graduated forming groove 171 in its upper side. The pressure bar 172 is pivotally mounted on the stud 173, threaded into the bracket 151; and the outer end of the bar 172 is urged downwardly into the groove 171 by the leaf spring 174.

The spring 174 is pivoted on a stud 175, fixed in the bracket 151, and the medial portion of the spring bears against the lower corner of the die block 170, as best shown in Fig. 26. The outer end of the spring 174 is connected to the outer end of the bar 172 by the double link 176, the link being hinged in the end of the spring and provided with hooks 177 which engage, at either side of the bar, with the pin 178 which is fixed in the end of the bar. This arrangement permits quick release of the spring to lift the bar out of the slot.

The partially formed strip passes over the roller 154 in the groove 180, formed therein, over the roller 155 and through the groove 171, during which passage the top tape D is fed on and formed around as shown in the progressive steps illustrated in Fig. 32 to Fig. 35, inclusive.

The tape D, in unwinding from the roll, passes around the guide roller 161 and over the roller 154 in the bottom of the notch 167, see Fig. 28, whereby the tape D is accurately guided and positioned on the strip as shown in Fig. 32.

The sides of the top tape are then bent down as shown in Fig. 29 and Fig. 33 by the flanges 182 of the folding roller 183, which co-operates with the roller 155. Roller 183 is rotatably mounted on a stud 184 which is adjustably positioned in a slot 185, formed in the bracket 151, and secured by the nut 186. In the block 170 the groove 171 is shaped so that the sides of the top tape are folded down and bent over as shown in Fig. 34 and Fig. 35, under the pressure from the bar 172, the space between the bar and the block being rectangular at the outer end, as shown in Fig. 31.

After the top tape has been placed on the completed strip S of the product, the strip is given a final compression, stenciled, and cut to length by the means which will now be described.

Mounted on the base B, as will be understood, in succeeding relation, are the bifurcated pedestals 190, 191, 192, which are similar in form, and the cutter frame 193, along the side of which is mounted the gear frame 194.

Journaled in the frame 194 and in the pedestal frame 190 is the drive shaft 195, on which is keyed the worm gear 196, shown in Fig. 1, which meshes with the worm 13 on the main drive shaft 3.

On the shaft 195, in the pedestal 190, is keyed a platen roller 197 which co-operates with the flanged pressure roller 17, rotatably mounted in the frame 190 directly above the platen roll, to form the pass in which the final compression and forming is accomplished.

After leaving the roller 17, the strip S passes under the stencil roller 18, which has the desired marking recessed or embossed in its periphery. The stencil roller 18 is rotatably mounted in the pedestal 192 and presses the strip against the platen roller 200, which is also rotatably mounted in the pedestal 192. The rollers 18 and 200 are connected by the intermeshing gears 201, 202, which are keyed on the shafts 203 and 204 of the rollers 18 and 200, respectively, and the gear 202 meshes with an idler gear 205, which is rotatably mounted in the pedestal 191, and which in turn meshes with a gear 206 which is keyed on the shaft 195. On the shaft 207, of the roller 17, is keyed a gear 208 which also meshes with the drive shaft gear 206.

By this arrangement the pairs of rollers 17 and 197, and 18 and 200, are positively rotated by the drive 195 so that the strip travels through each pair at the proper speed.

Subsequent to the stenciling operation, the strip passes under the blade 210 of the cutter 19, and is cut into the desired lengths without stopping the motion of the strip, by the mechanism which will now be described in detail.

In Figs. 36 to 39, inclusive, the blade 210 is shown in the instantaneous position of cutting, but it will be understood that normally the blade is slightly raised so that the strip can travel freely under the same.

Bridging the two sides 211 and 212 of the frame 193, at the forward end of the same, is secured an anvil 213, the face of which is provided with an insert 214 of ductile metal, such as copper, for receiving the blow of the blade in severing the completed strip while it is running over the anvil.

The blade 210 is rigidly secured in the swinging end of the hammer lever 215. This lever is bifurcated at the pivoted end to straddle the strip S, and provided with short pivot shafts 216 at either side, which are rotatably mounted in suitable bearings in the two frame sides 211 and 212.

Below the shafts 216, in the sides of the frame 193, and also in the gear frame 194, is rotatably mounted the hammer drive shaft 217. On the outer side of the frame 194 is provided a gear 218 which is fixedly secured to the shaft 217 and which is connected for driving with the gear 220, keyed on the shaft 195, through the idler gears 221 and 222 which are rotatably mounted on suitable studs secured in the gear frame 194. The gears 218, 220, 221, and 222 are interchangeable and several holes are provided in the frame for the idler gear studs whereby several different speed ratios between the shafts 195 and 217 may be readily obtained for cutting different lengths.

On the shaft 217, between the sides of the frame 194, is fixed a cam 224 which co-operates with the lever 225, fixed on the shaft 216 above the cam 224, to raise and lower the hammer lever 215. The cam has a dwell surface 226 which, through the greater part of its rotational movement, engages the end of the lever 225, which is fixedly mounted on the pivot shaft 216, and holds the lever 215 up so that the blade 210 clears the strip S. At the end of the dwell the cam has a rise 227 which further raises the hammer 215, and the dwell terminates in a sudden drop 228 which becomes radial with the axis of the shaft 216 and allows the hammer to drop suddenly. The hammer is caught substantially on the rebound by the shoulder 229 at the beginning of the dwell 226.

The hammer lever is urged to rotate counterclockwise against the action of the cam by means of the heavy spring 230. The loop of the spring bears against the outer end of the lever 215, and the side portions are coiled around the bosses of the pivot shaft bearings in 211 and 212, and the ends of the spring are provided with loops 231 which encircle the tension adjusting rods 232.

The rods 232 are threaded through bosses 234, formed on the sides of the frame 194, and are locked in adjusted positions by the lock nuts 235 which are threaded on the inner ends of the rods. On each rod is pinned a collar 236 which provides an abutment in one direction for the spring loop 231. The rods are adjusted so that there is very little or no tension left in the hammer-actuating spring 230 when the blade strikes the strip. For partially raising the hammer a tension spring 237 is extended between an arm 238, which projects from one hub of the lever 215, and a staple 239 which is secured in the base of the frame 194, and the length of spring 237 is such that it is tensioned only when the lever 215 is down. The spring ends 231 are prevented from jumping off the rods 232 by the cross pins 240 when the hammer rebounds.

By the cutting mechanism just described the strip is struck with a sharp blow from the inertia in the hammer which is gained when the hammer is lifted by the cam lobe 227 against the action of the spring 230, and the strip is cleanly severed without interfering with its forward movement.

In the foregoing I have explained the method and described the machine for manufacturing a double covered welding, brazing or hard soldering bar, but it is evident that other products may be produced in the same manner without departing from the spirit of the invention for which I make the following claims:

1. In a welding rod machine, a tape reel, a pair of rollers for pulling the tape from the reel, a core material feed hopper between the reel and the rollers, and a bar in the bottom of the hopper, the bar having a channel formed therein through which the tape is passed and thereby formed into a trough shape to receive the material as it passes through the hopper.

2. In a welding rod machine, a feed hopper, a bar mounted in the bottom of the hopper, the bar having a channel which converges from an open trough in the hopper into a rectangular outlet, and a pair of rolls for pulling the tape through the channel.

3. In a welding rod machine, a feed hopper, means for pulling the sheathing tape through the hopper, stationary guides in the hopper for folding up the sides of the tape as it passes through the hopper, and stirring means in the hopper for working the material in the hopper into the tape as the tape is moved along.

4. In a welding rod machine, a feed hopper, means for pulling the sheathing tape through the feed hopper, stationary guides in the hopper, means in the hopper for folding up the sides of the tape, means in the feed hopper for working the material therein into the tape, and a mixing hopper having an opening for discharging the core material into the feed hopper at a predetermined rate.

5. In a welding rod machine, a feed hopper for feeding loose core material onto a moving tape, a mixing hopper for mixing the material and having an opening for discharging the mixed material into the feed hopper, and an adjustable gate for regulating the area of the opening to maintain a substantially constant amount of the material in the feed hopper.

6. In a welding rod machine, a feed hopper for the loose core material, a bar mounted in the bottom of the hopper and having a trough-shaped channel, means for moving the sheathing tape through the channel, and movable bars mounted in the hopper to scrape across the bottom of the hopper to work the material evenly into the tape as the tape moves through the channel.

7. In a welding rod machine, a feed hopper for the core material, a bar having a channel formed therein mounted in the bottom of the hopper, means for moving the sheathing tape through the channel, and a cage rotatably mounted in the hopper, the cage having spiral-shaped bars for scraping along the bottom of the hopper to work the material evenly into the channel.

8. In a welding rod machine, a feed hopper for the core material, a bar having a trough-shaped channel mounted in the bottom of the hopper, a plate covering the channel and having a slot opening into the hopper, means for moving the sheathing tape through the channel, the slot being narrower than the top of the channel to cover the edges of the tape.

9. In a welding rod machine, a bar having a channel for forming the sheathing tape into a trough for receiving the core material, means for moving the tape through the channel and maintaining the tape under tension, and a roller mounted on the front end of the bar to depress the middle of the tape to enter the channel, the roller being positioned so that sufficient resiliency remains in the tape after passing under the roller to cause the sides of the tape to press against the walls of the channel and form a seal.

10. In a welding rod machine, a bar having a channel for forming the sheathing tape into a trough for receiving the core material, means for moving the tape through the channel and maintaining the tape under tension, and means for partially depressing the middle of the tape at the front of the bar so that the tape has sufficient resiliency to cause the sides of the tape to press tightly against the sides of the channel and form a seal.

11. In a welding rod machine, a core material hopper having a channel formed therein, a tape reel having a surface against which the roll of sheathing tape is rotatably mounted in alignment with the channel, means for pulling the tape from the reel and through the channel, and a plate non-rotatably mounted on the reel and spring-pressed against the side of the roll to hold the tape against said surface for guiding the tape and tensioning the same.

12. In a welding rod machine, a bar having a channel for forming the sheathing tape into a trough for receiving the core material, a forming block at the end of the bar for closing the tape around the material, and means for pulling the tape through the channel and the block.

13. In a welding rod machine, a core material hopper, a bar removably mounted in the bottom of the hopper, the bar having a tape channel opening into the hopper, a forming die block removably mounted on the end of the bar for closing the tape around the core material, and a pair of pressure rolls engaging the strip of material filled tape to pull the tape through the channel and block and to compress the strip.

14. In a welding rod machine, means for forming the sheathing around the loose core material in a continuously moving strip, means for compressing the strip to condense the core and drive out the excess moisture.

15. A welding rod machine comprising means for folding a continuously moving sheathing tape around the loose core material, means for simultaneously heating and compressing the moving strip thus formed, means for adding an outer sheathing tape around the compressed strip, and a pair of compression rollers gripping the strip between each of said means for moving and forming the strip.

16. A welding rod machine comprising means for folding a continuously moving sheathing tape around the loose core material, means for gradually heating and compressing the moving strip thus formed, means for adding an outer sheathing tape around the compressed strip, and a pair of compression rollers gripping the strip between each of said means for moving and forming the strip.

17. A welding rod machine comprising means for feeding two sheathing tapes in superposed relation, means for feeding loose core material onto the bottom tape, means for folding the bottom tape around the material, means for compressing the strip thus formed, means for folding the top tape around the compressed strip, and driving and compressing rolls engaging the strip between each of said means.

18. In a welding rod machine, means for forming a sheathing tape around the core material in a continuous strip, means for gradually compressing the formed strip, means for guiding an outer sheathing tape on to the strip, means for bending and folding the outer tape around the strip, and means for pulling the strip with the tape through said means.

19. In a welding rod machine, means for sheathing the cored strip comprising means for guiding the outer sheathing onto the strip, means for bending down the sides of the outer sheathing, means for folding the sides of the outer sheathing around the strip, and a pair of compressing and driving rollers engaging the strip subsequent to said means for pulling the strip and sheathing through the same.

20. In a welding rod machine, means for sheathing the cored strip comprising fixedly mounted strip supports and pressure members cooperating with the supports for guiding and forming the sheathing tape around the strip, the supports being fixedly mounted and the pressure members being quickly adjustable into or out of co-operative relation with the pressure members.

21. In a welding rod machine, means for sheathing the cored strip comprising a grooved roller for guiding the strip, a block having a notch for engaging the grooved roller and guiding the sheathing tape onto the strip, a plain roller for supporting the strip, a flanged roller cooperating with the plain roller to bend the tape down at the sides, a die block having a tapered groove, a spring pressed bar for pressing the tape and strip into the tapered groove and folding the sides of the tape around the strip, and a pair of compressing and driving rolls engaging the strip with the tape formed therearound.

22. In a welding rod machine, a pair of driving rolls engaging the strip of cored rod, an anvil mounted under the strip, a hammer for striking the anvil to sever the strip, means geared to the driving rolls for operating the hammer and catching it on the rebound so that the movement of the strip is not interrupted.

23. In a welding rod machine, means for forming the rod in a continuously moving strip of tape, an anvil mounted under the tape, a hammer having a blade for striking the tape, and means for catching the hammer on the rebound so that the movement of the tape is not interrupted.

24. In combination in a welding rod machine, a frame, an anvil mounted in the frame, a hammer lever pivotally mounted in the frame and having a blade for striking against the anvil to sever the rod, a cam rotatably mounted in the frame for operating the lever, and a pair of continuously driven rollers for moving the rod along, the cam being positively geared to the rollers.

25. In combination in a welding rod machine, means for forming the sheathing around a core in a continuously moving strip, an anvil supporting the strip, a pivotally mounted hammer having a blade portion for striking against the anvil to sever the strip, and means connected to said means for raising, dropping and catching the hammer on the rebound so that the movement of the strip is not interrupted.

26. In a welding rod machine, means for continuously moving a sheathing tape, means for folding the moving tape around loose core material, means for compressing the strip thus formed, and means for adding an outer sheathing tape around the compressed strip.

27. A welding rod machine comprising means for folding a continuously moving tape around loose core material, means for adding an outer sheathing tape around the compressed strip, and a pair of compression rollers gripping the strip between each of said means for moving and forming the strip.

28. A welding rod machine comprising means for feeding two sheathing tapes in superposed relation, means for feeding loose core material onto the bottom tape, means for folding the bottom tape around the material, means for compressing the strip thus formed, means for folding the top tape around the compressed strip, driving and compressing rollers between said means, and means for chopping the finished strip without stopping its movement.

29. In a welding rod machine, means for forming sheathing around loose core material, a heating chamber through which the strip travels, and moving belts traveling through the chamber and engaging opposite sides of the strip, one of the belts being recessed to form a groove for receiving the tape.

30. In a welding rod machine, means for forming sheathing tape around loose core material, the sheathing being in continuously moving strip, a heating chamber enclosing a portion of the tape where it has been folded around the core, a pair of endless belts in superposed relation engaging opposite sides of the tape for supporting the tape in the chamber, and means for moving the belts along with the tape.

31. In a welding rod machine, means for holding sheathing around loose core material, a heating chamber through which the rod thus formed is caused to pass, a support bar in the chamber, a belt moving on the bar for carrying the rod, a second belt traveling along on top of the strip, and a pressure bar resting loosely on the top of the second belt.

32. In a welding rod machine, means for folding sheathing around loose core material to form a continuous rod, a heater having a series of compartments through which the rod is caused to travel, the compartments being at relatively increasing temperatures, and means for holding the tape under gradually increasing pressure while it is travelling through the compartments.

33. In a welding rod machine, means for folding the sheathing around loose core material, the sheathing being in a continuously moving strip, a heating chamber enclosing a portion of the folded strip, two chain belts in co-operative relation for embracing and carrying the strip through the heater, a support for the belts, and a pressure bar resting on the belts for applying pressure for compressing the strip.

Signed at Chicago, this 30th day of October, 1928.

K. H. TERNSTEDT.